United States Patent
Saha et al.

(10) Patent No.: US 8,266,289 B2
(45) Date of Patent: Sep. 11, 2012

(54) CONCURRENT DATA PROCESSING IN A DISTRIBUTED SYSTEM

(75) Inventors: Bikas Saha, Bellevue, WA (US); Ronnie Chaiken, Woodinville, WA (US); James David Ryseff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 12/428,964

(22) Filed: Apr. 23, 2009

(65) Prior Publication Data
US 2010/0275212 A1 Oct. 28, 2010

(51) Int. Cl.
G06F 15/173 (2006.01)
(52) U.S. Cl. .......... 709/226; 700/99; 704/E15.048; 705/7.12; 718/104
(58) Field of Classification Search .......... 709/226; 700/99; 704/E15.048; 705/7.12; 718/104
See application file for complete search history.

(56) References Cited

U.S. PATENT DOCUMENTS

| | | | | |
|---|---|---|---|---|
| 4,744,028 A * | 5/1988 | Karmarkar | ..... | 705/7.22 |
| 4,885,686 A * | 12/1989 | Vanderbei | ..... | 700/99 |
| 5,128,860 A * | 7/1992 | Chapman | ..... | 700/99 |
| 5,179,702 A * | 1/1993 | Spix et al. | ..... | 718/102 |
| 5,235,508 A * | 8/1993 | Lirov et al. | ..... | 700/99 |
| 5,588,138 A | 12/1996 | Bai | | |
| 6,104,962 A * | 8/2000 | Sastry | ..... | 700/86 |
| 6,594,698 B1 * | 7/2003 | Chow et al. | ..... | 709/226 |
| 7,002,586 B2 * | 2/2006 | Chiu et al. | ..... | 345/505 |
| 7,165,103 B2 * | 1/2007 | Harvey et al. | ..... | 709/223 |
| 7,272,820 B2 | 9/2007 | Klianev | | |
| 7,337,443 B2 * | 2/2008 | Welland et al. | ..... | 718/102 |
| 7,478,162 B2 * | 1/2009 | Roadknight et al. | ..... | 709/229 |
| 7,730,119 B2 * | 6/2010 | Bates et al. | ..... | 709/201 |
| 7,814,492 B1 * | 10/2010 | Creemer et al. | ..... | 718/104 |
| 7,937,705 B1 * | 5/2011 | Prael et al. | ..... | 718/102 |
| 7,953,843 B2 * | 5/2011 | Cherkasova | ..... | 709/224 |
| 7,984,151 B1 * | 7/2011 | Raz et al. | ..... | 709/226 |
| 2003/0130755 A1 * | 7/2003 | Bazzocchi et al. | ..... | 700/100 |
| 2004/0204978 A1 * | 10/2004 | Rayrole | ..... | 705/8 |
| 2005/0223382 A1 | 10/2005 | Lippett | | |
| 2006/0242633 A1 * | 10/2006 | De Rijck | ..... | 717/140 |
| 2006/0265713 A1 * | 11/2006 | Depro et al. | ..... | 718/104 |
| 2007/0050777 A1 * | 3/2007 | Hutchinson et al. | ..... | 718/104 |

(Continued)

OTHER PUBLICATIONS

Isard, Michael, et al., Dryad: Distributed Data-Parallel Programs from Sequential Building Blocks, Microsoft Research, Silicon Valley, pp. 1-14, http://research.microsoft.com/en-us/projects/dryad/eurosys07.pdf.

Suter, Frederic, et al., Concurrent Scheduling of Parallel Task Graphs on Multi-Clusters Using Constrained Resource, Dec. 2008, Nancy University, pp. 1-22, http://hal.archives-ouvertes.fr/docs/00/34/72/03/PDF/RR-6774.pdf.

(Continued)

*Primary Examiner* — Alina N. Boutah
(74) *Attorney, Agent, or Firm* — Shook Hardy & Bacon L.L.P.

(57) ABSTRACT

Systems, methods, and computer media for scheduling vertices in a distributed data processing network and allocating computing resources on a processing node in a distributed data processing network are provided. Vertices, subparts of a data job including both data and computer code that runs on the data, are assigned by a job manager to a distributed cluster of process nodes for processing. The process nodes run the vertices and transmit computing resource usage information, including memory and processing core usage, back to the job manager. The job manager uses this information to estimate computing resource usage information for other vertices in the data job that are either still running or waiting to be run. Using the estimated computing resource usage information, each process node can run multiple vertices concurrently.

18 Claims, 8 Drawing Sheets

U.S. PATENT DOCUMENTS

| | | | |
|---|---|---|---|
| 2007/0091089 A1* | 4/2007 | Jiao et al. | 345/426 |
| 2007/0143765 A1* | 6/2007 | Aridor et al. | 718/104 |
| 2007/0271381 A1* | 11/2007 | Wholey et al. | 709/226 |
| 2008/0052718 A1* | 2/2008 | Hundscheidt | 718/104 |
| 2008/0098375 A1* | 4/2008 | Isard | 717/149 |
| 2009/0089139 A1* | 4/2009 | Rojas-Cessa et al. | 705/9 |
| 2009/0172561 A1* | 7/2009 | Driemeyer et al. | 715/744 |
| 2009/0249350 A1* | 10/2009 | Senders et al. | 718/104 |
| 2009/0254916 A1* | 10/2009 | Bose et al. | 718/104 |
| 2009/0254917 A1* | 10/2009 | Ohtani | 718/104 |
| 2009/0300634 A1* | 12/2009 | Ramsey | 718/104 |
| 2010/0017638 A1* | 1/2010 | Ghose | 713/324 |
| 2010/0175049 A1* | 7/2010 | Ramsey et al. | 717/115 |
| 2010/0229218 A1* | 9/2010 | Kumbalimutt et al. | 726/4 |
| 2010/0235843 A1* | 9/2010 | Appa et al. | 718/104 |
| 2010/0259540 A1* | 10/2010 | Loop et al. | 345/423 |

OTHER PUBLICATIONS

Cong, Guojing, et al., Techniques for Designing Efficient Parallel Graph Algorithms for SMPs and Multicore Processors, IBM TJ Watson Research Center, Yorktown Heights, New York and College of Computing, Georgia Institute of Technology, Atlanta, Georgia, pp. 1-11, http://www.cis.udel.edu/~cavazos/cisc879/papers/MulticoreGraph-ISPA2007.pdf.

Liu, Xuli, Exploiting Object-Based Parallelism on Multi-Core Multi-Processor Clusters, University of Nebraska at Kearney, Kearney, Nebraska, pp. 259-266, http://ieeexplore.ieee.org/ielx5/4420121/4420122/04420179.pdf?arnumber=4420179.

* cited by examiner

CONCURRENT DATA PROCESSING IN A DISTRIBUTED SYSTEM

BACKGROUND

Technological advances over the past several decades have dramatically increased computer data file sizes. Advances in processor speed, memory, storage capacity, and other areas have allowed computing devices to continue to process and perform operations on these larger files. Despite these advances, some data files are large enough that it is either necessary or beneficial to distribute the data processing of one large file by dividing the file into smaller portions and processing each portion individually rather than attempting to process the entire file at one time on one computing device.

When a large data file is processed, the user who requests the processing often includes the computer code or application that is to be run on the data file. Because the application is unknown to the distributed data processing system to which the data and application are sent, the processing system is unable to estimate or determine the amount of computing resources to allocate to each portion of the large data file. To prevent a computing device from running out of computing resources as it processes multiple portions of the large data file, distributed data processing systems today allocate an entire computing device to each portion of the large file. In many instances, however, the resources of an entire computing device are not necessary to process a particular portion of the large file. In such cases, the computing device is used inefficiently, and the completion of the distributed processing is unnecessarily delayed by waiting for the computing device to process data portions one-at-a-time when sufficient computing resources are available to process data portions concurrently.

SUMMARY

Embodiments of the present invention relate to systems, methods, and computer media for scheduling vertices and allocating computing resources in a distributed data processing system. Using the systems and methods described herein, a large data job is received by a job manager. The data job is divided into smaller portions called vertices that are assigned to processing nodes. Each vertex runs on a processing node. When a vertex completes, information is transmitted back to the job manager detailing the amount of the processing node's computing resources that were used in running the vertex. The job manager uses this information to calculate resource usage estimates for the remaining vertices of the same data job that have not completed. This estimated resource usage information is transmitted to all process nodes running vertices of the data job. The processing nodes use this estimated resource usage information to allocate computing resources to the assigned vertices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

As discussed above, despite continued advances in computing technology, data files are often so large that performing operations on the data files is difficult or impossible for many computing devices unless the data files are first divided into smaller units. Distributed data processing systems are used to divide and process large data files. Typically, a distributed data processing system has a job manager that receives a data job. The data job includes the data to be processed as well as the application that will run on the data. For example, a data job might include a word processing document and computer code that will search the word processing document for particular words.

The job manager divides the data job into small work units called vertices. Like the data job, each vertex includes an amount of data to be processed along with the code that will be run on the data. The job manager assigns each vertex to a processing node that is part of the distributed processing system. Processing nodes are computing devices that receive and run vertices. More than one vertex may be assigned to the same processing node.

Because the job manager is typically provided no information about the nature of the operations to be performed on the data, the job manager is unable to accurately estimate the computing resources each vertex will consume. As a result, each process node simply assumes each assigned vertex will consume all of the available computing resources and runs one vertex to completion before beginning to run a second vertex. In many instances, however, the complete resources of a process node are not necessary to run only one vertex at a time. In such cases, the computing device is used inefficiently, and the completion of the distributed processing is unnecessarily delayed by waiting for the computing device to process vertices one-at-a-time when sufficient computing resources are available to process vertices concurrently.

Embodiments of the present invention provide systems, methods, and computer media for scheduling vertices and allocating computing resources based on estimated resource usage, allowing multiple vertices to be run concurrently on one process node. In this application, the terms "computing resource usage" and "resource usage" are used interchangeably. In accordance with embodiments of the invention, the job manager assigns vertices to multiple process nodes, which run the assigned vertices. In some embodiments, assigned vertices are placed in a queue and run in order according to the queue. When vertices complete, that is, when the code provided in a vertex finishes running on the data provided in the vertex, process nodes record and transmit computing resource usage information back to the job manager. Computing resource usage information includes at least one of processing core use, memory use, disk use, and network use, as well as other information.

When the job manager receives computing resource usage information from one or more vertices of a data job that have completed, the job manager estimates a range of input data sizes for the remaining vertices of the data job that have not yet completed. This may be accomplished through a bucketing system, where the data size of the completed vertices is used to create an estimated input data range. The input data size used may be that of the first vertex to complete, an average of all vertices that have completed, or some other vertex that has completed. The estimated input data range is divided into buckets, where each bucket represents a smaller data input range or a particular data value. The job manager stores the actual computing resource usage information received from the completed vertices in the appropriate bucket for the vertices' input data size. The job manager receives computing resource usage information from additional vertices as they complete and stores the received information in the bucket corresponding to the vertices' data size.

As vertices continue to complete, the job manager has more data for different buckets and is better able to estimate computing resource usage for vertices corresponding to those buckets. By assuming that the data portions contained in each vertex of a single data job are similar and running similar code, different vertices containing data portions of approximately the same size are estimated to use approximately the same computing resources to complete. For each bucket (vertex data size), as the job manager receives resource usage information for completed vertices of that bucket size, the job manager refines the estimated resource usage information for other vertices of approximately the same size that have not completed. For example, if the job manager receives computing resource usage information for five completed vertices of approximately 2 gigabytes in size, the job manager may calculate an average of the received computing resource usage information of the five completed vertices as an estimate of the computing resource usage of other 2-gigabyte vertices that have not completed. Similarly, if the job manager receives computing resource usage information for five completed vertices of approximately 1 gigabyte in size, the job manager may calculate an average of the received computing resource usage information for the five completed vertices as an estimate of the computing resource usage of other 1-gigabyte vertices that have not completed.

The job manager transmits estimated resource usage information to the process nodes either running or waiting to run vertices from the data job. In some embodiments, as each vertex completes, resource usage information is transmitted to the job manager, which then updates the estimated resource usage for similarly sized vertices that have not completed. Process nodes use this estimated resource usage information to allocate computing resources to vertices. Previously, as discussed above, each vertex on a process node was run to completion before a second vertex was started on that process node because it was unknown how many computing resources were required. Using the estimated resource usage information in embodiments of the present invention, process nodes run multiple vertices concurrently.

Figure 1:
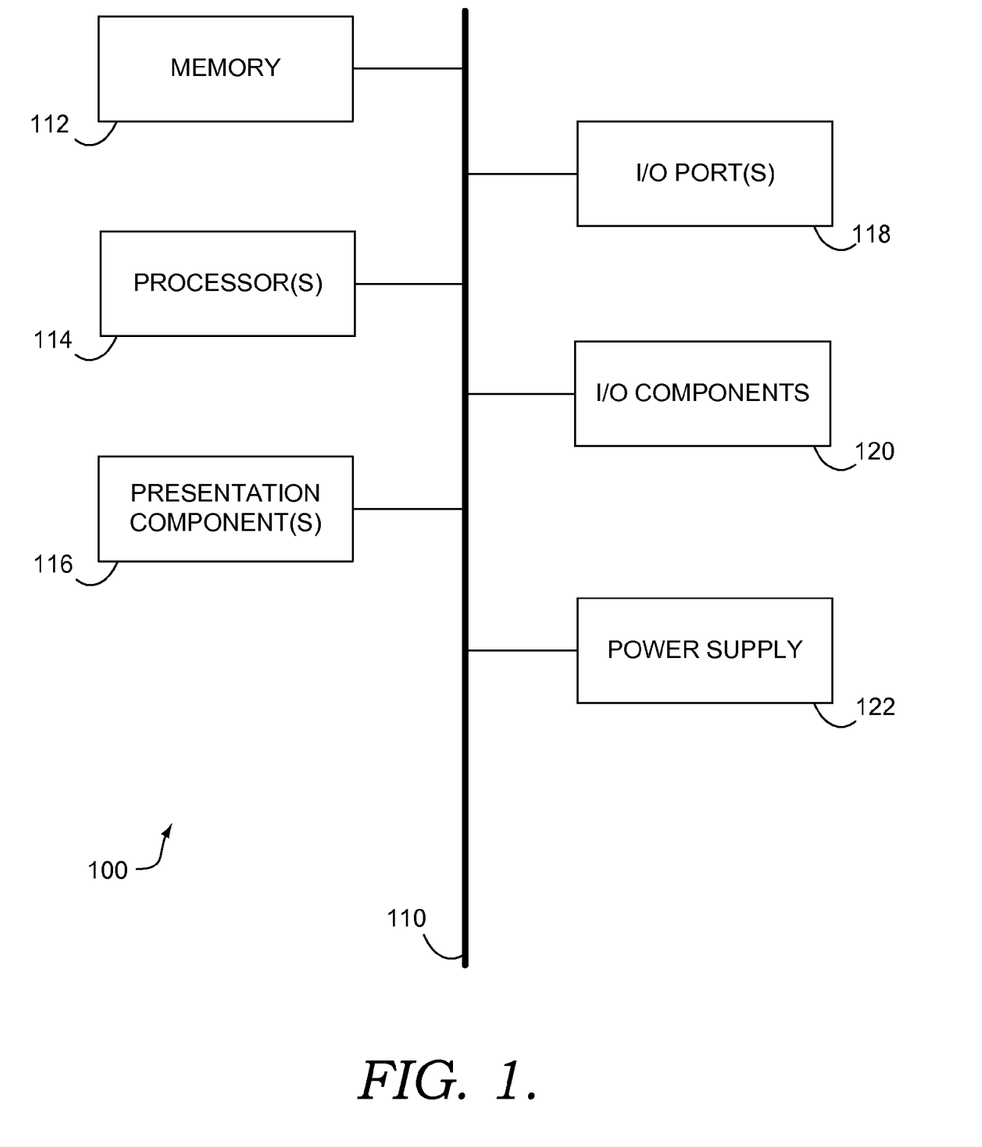
FIG. 1 is a block diagram of an exemplary computing environment suitable for use in implementing the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention provide systems, methods, and computer media for scheduling vertices and allocating computing resources based on estimated resource usage, allowing multiple vertices to be run concurrently on one process node. Embodiments of the invention will be discussed in reference to FIGS. 2-8.

Figure 2:
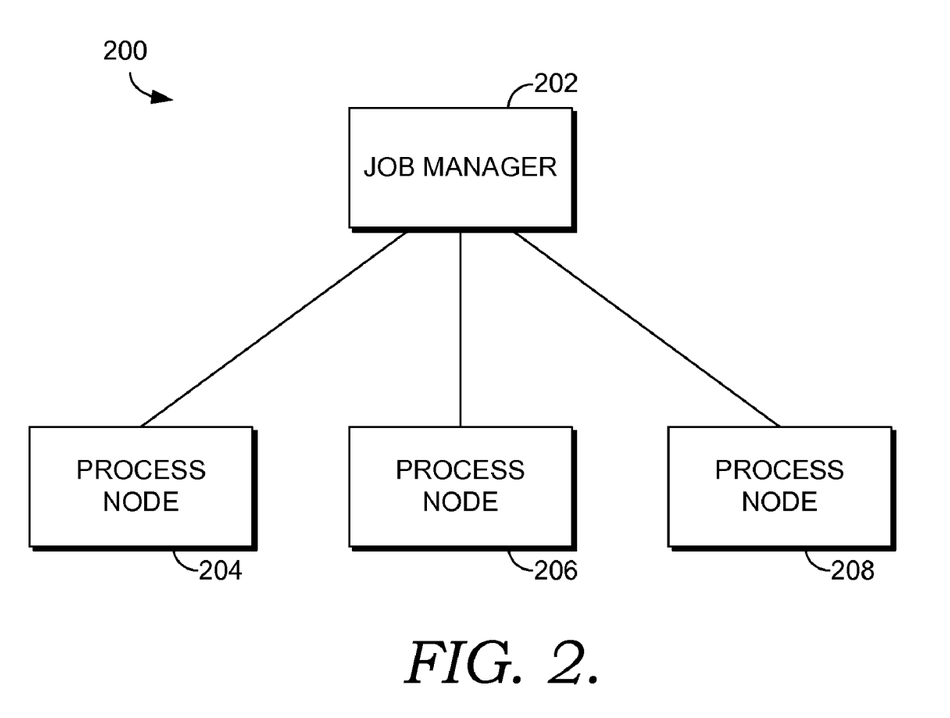
FIG. 2 is a block diagram of a distributed data processing system according to an embodiment of the present invention.

A distributed data processing system 200 is illustrated in FIG. 2. Job manager 202 receives data jobs that require processing. Job manager 202 may be a server or other computing device and may in some embodiments be a functional component of another physical computing device. Data jobs may be requested by job manager 202 or may be transmitted to job manager 202 unsolicited. Job manager 202 divides received data jobs into vertices to enable distributed processing. In some embodiments, data jobs may be divided into vertices before being transmitted to job manager 202. The data portion contained in each vertex may be approximately the same size. In some embodiments, the size of the data portion contained in each vertex may vary. In other embodiments, the size of the data portion may be one of several common sizes. Job manager 202 assigns the vertices into which a data job is divided to process nodes 204, 206, and 208.

Process nodes 204, 206, and 208 are computing devices that run vertices. Although only three process nodes are shown for simplicity, any number of process nodes is contemplated. In some embodiments, vertices assigned to a particular process node are placed in a queue on that process node and are run in a first-in, first-out order. Each process node allocates computing resources to running a particular vertex. In some embodiments, process nodes 204, 206, and 208 may allocate all available computing resources to running one vertex at a time until estimated resource usage information is received from job manager 202.

Job manager 202 estimates computing resource usage information for vertices that have not completed based on actual computing resource usage information received for one or more vertices that have completed. In some embodiments, each process node transmits actual computing resource usage information for each completed vertex to job manager 202. Job manager 202 uses the actual computing resource usage information to update the estimated resource usage for vertices that have not completed and transmits the updated estimates to the process nodes where the incomplete vertices are either running or will run. In this way, the more vertices that complete, the more accurate the estimated resource usage information for the incomplete vertices is likely to be.

In some embodiments, job manager 202 creates estimated resource usage values after receiving actual computing resource usage information for one or more completed vertices. In one embodiment, an estimated input data range is created by identifying the size of the data processed in the completed vertices, multiplying the data size by one half to create a lower bound, and multiplying the data size by two to create an upper bound. In other embodiments, the input data size of the first vertex to complete, the input data size of another completed vertex, or the average input data size of multiple completed vertices may be used to create the input data range. The data size range bounded by the upper and lower bound is divided into a number of buckets, which in one embodiment is approximately 100 buckets. Each bucket represents a subset of the input range or a particular data value. The job manager stores the actual computing resource usage information received from the completed vertices in the appropriate bucket for the vertices' input data size. The job manager receives computing resource usage information from additional vertices as they complete and stores the information in the bucket corresponding to the vertices' data size. In some embodiments, the bucketed range may be dynamically adjusted each time actual computing resource usage information is received for a completed vertex.

Because the actual computing resource usage of the completed vertices and size of the data processed by the completed vertices are known, estimated computing resource usage for other vertices of approximately the same input data size can be determined. Each bucket contains an estimate of resource usage for vertices processing a certain amount of data. In one embodiment, the job manager waits to estimate resource usage for uncompleted vertices of a particular data input size until actual computing resource usage information for at least five vertices of approximately that particular input size have been received. Estimation based on actual computing resource information for a smaller or larger number of completed vertices is also contemplated. Resource usage estimates are more accurate when the job manager has received resource usage information for more completed vertices, but the more information an estimate is based on, the longer the delay in creating the estimate.

In some embodiments, if the relationship between the input data size and computing resource usage is known, a ratio between data size and resource usage is computed. For example, if it is known that the relationship is linear, then actual computing resource usage information of 1 gigabyte of memory and 1 processing core for a 2 gigabyte input data size can be used to estimate computing resource usage of 2 gigabytes of memory and 2 processing cores for a 4 gigabyte input data size. This ratio can be used to estimate computing resource usage information for all input data sizes. As more vertices complete and the job manager receives more actual computing resource usage information, the estimates may be updated.

In other embodiments, the job manager may determine the character of the relationship between input data size and computing resource usage from the input sizes and actual computing resource usage information for several vertices before computing a ratio and estimating computing resource usage information for all input data sizes as described above. Although other estimation methods are envisioned, estimate calculation through bucketing allows the estimates to be calculated quickly, which allows vertices to be run concurrently on the process nodes for a longer period of time than other estimation methods allow.

Process nodes 204, 206, and 208 allocate their computing resources to vertices based on estimated computing resource usage information received from job manager 202. As job manager 202 receives actual resource usage information for additional completed vertices and transmits updated resource usage estimates to process nodes 204, 206, and 208, process nodes 204, 206, and 208 adjust their computing resource allocation to vertices that have not finished running. Using the estimated resource usage information, process nodes 204, 206, and 208 allocate computing resources to vertices such that multiple vertices run concurrently on processing nodes 204, 206, and 208. In some embodiments, each processing node reserves some computing resources for running processes that are not vertices and reserves some computing resources as free resources that are not used by any running processes.

Process nodes 204, 206, and 208 continue to allocate computing resources to vertices as long as the processing node has more available computing resources than it is estimated the next vertex will use. Because process nodes 204, 206, and 208 are allocating computing resources based on estimates, each time a vertex runs it is possible that the vertex will require more computing resources than was estimated. If a particular process node is using nearly all of its computing resources running vertices, and a running vertex begins to require more resources that the process node has available, the process node terminates one of the running vertices. In some embodiments, the process node terminates the vertex that was the last to begin. In other embodiments, the process node continues to terminate vertices in order of most recent to begin until enough computing resources are freed to allow the vertex using more resources than estimated to complete.

Some vertices may demand a large amount of computing resources. In certain embodiments, if a process node such as process node 204, 206, or 208 has available computing resources, but the vertex that is next in the queue of the process node is estimated to require more computing resources than the process node has available, the process node may flag the vertex and run a vertex further back in the queue instead. It is possible that each time a vertex completes and computing resources become available, the flagged vertex will continue to be skipped because insufficient computing resources are available, thus delaying the completion of the data job of which the flagged vertex is a part.

In some embodiments, the process node or job manager 202 determines in which instances running a smaller vertex further back in the queue rather than the flagged vertex is allowed. In such embodiments, the vertex in the queue behind the flagged vertex will run only if the process node, such as process node 204, 206, or 208, or job manager 202 determines that the flagged vertex will begin to run no later than the sum of the time T that the currently running vertices will take to complete and an acceptable delay for the flagged vertex. If instead of running a vertex in the queue behind the flagged vertex, the process node were to allow all currently running vertices to complete in order to free sufficient resources to run the flagged vertex, the flagged vertex would begin to run at a time T after the flagged vertex was flagged. By electing to run a smaller vertex in the queue behind the flagged vertex, the flagged vertex may not begin to run until after time T. An acceptable delay beyond time T is determined as the greater of a specified percentage of the flagged vertex's expected run time or a specified minimum delay.

Figure 3:
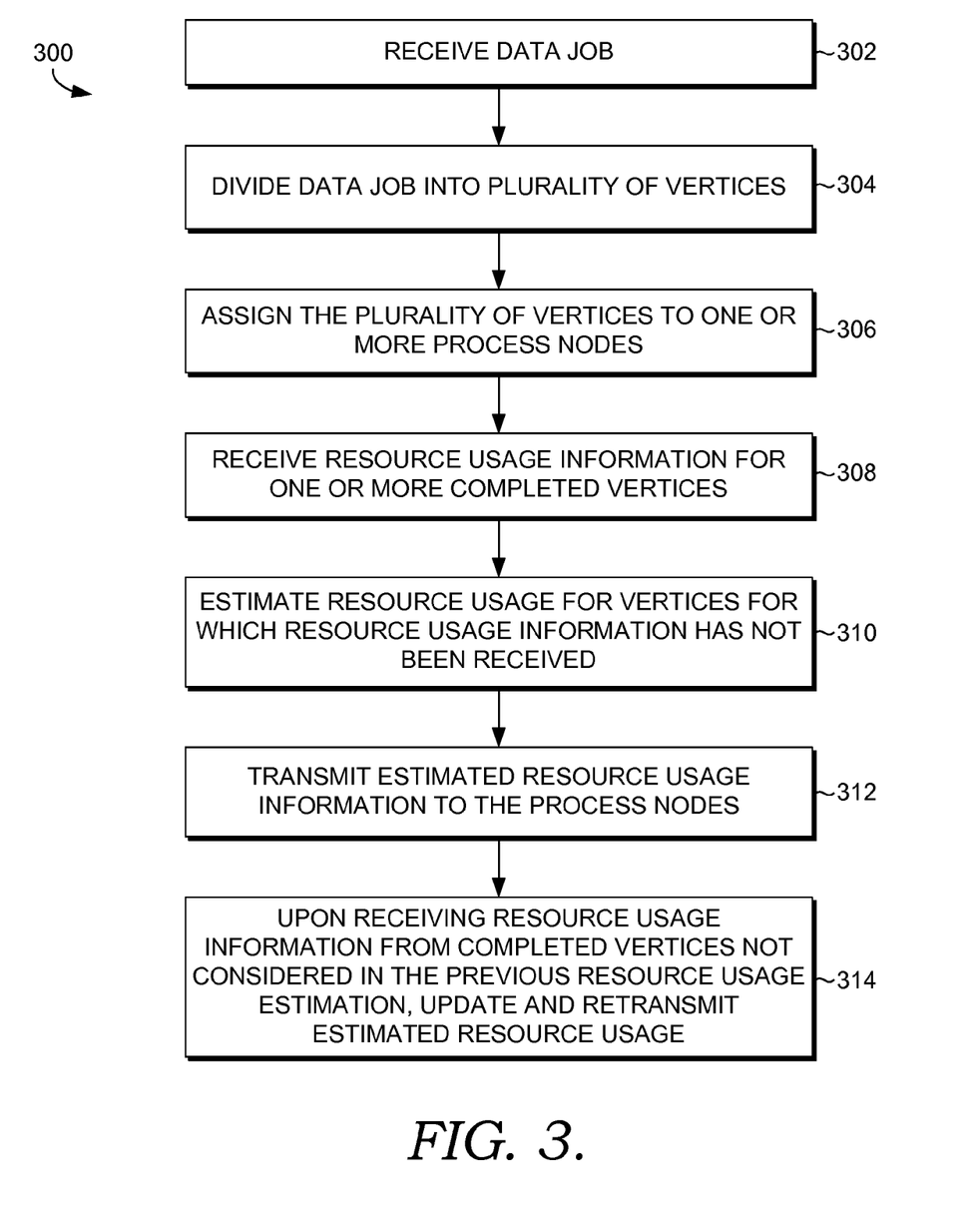
FIG. 3 is a flow chart of an exemplary method for scheduling vertices through resource usage estimation in a distributed data processing system.

FIG. 3 illustrates a method 300 for scheduling vertices in a cluster of process nodes. In step 302, a job manager, such as job manager 202 in FIG. 2, receives a data job. The job manager may have requested the data job, or the job may have been sent unsolicited. The data job is divided into a plurality of vertices in step 304. As discussed in detail above, each vertex contains both a portion of data from the data job as well as computer code to run on the data portion. In some embodiments, the data job is divided into a plurality of vertices before it is received by the job manager. The vertices created in step 304 may be approximately the same size.

The vertices created in step 304 are assigned to one or more process nodes that comprise the cluster, such as process nodes 204, 206, and 208 of FIG. 2, in step 306. More than one vertex may be assigned to each process node. In some embodiments, each process node places assigned vertices in a queue on a first-in, first-out basis. The job manager may assign each process node an equal number of vertices or may assign vertices based on the length of each process node's queue. In some embodiments, the process nodes will initially each dedicate all of their computing resources to running one vertex at a time until the process nodes receive estimated resource use information for the remaining vertices that have not begun to run.

In step 308, the job manager receives resource usage information for one or more completed vertices. After receiving assigned vertices from the job manager, each process node runs the first vertex it was assigned. Upon completing the vertex, each process node transmits resource usage information to the job manager. This information may include memory usage, processing core usage, disk usage, network usage, and other resource usage information. In some embodiments, only resource usage information for the first completed vertex is received.

The job manager uses the received resource usage information for the one or more completed vertices to estimate resource usage in step 310 for the vertices of the same data job for which the job manager has not yet received resource usage information. As discussed in detail above, assuming that the data portions contained in each vertex of a single data job are similar and that vertices of a data job are running similar code, different vertices containing data portions of approximately the same size will use approximately the same computing resources to complete. In some embodiments, for a particular input data size, the job manager waits until it has received actual computing resource usage information for at least five completed vertices before estimating resource usage information for other vertices of approximately the same input data size. In other embodiments, a ratio is calculated between input data size and resource usage, allowing estimation of resource usage for other vertex input data sizes using only the actual computing resource usage information for the first completed vertex. In some embodiments, the job manager estimates a vertex input data range, based on the input data size of completed vertices, through a bucketing method 400, illustrated in FIG. 4. The buckets are used in the job manager's estimation of computing resource usage for each input data size, as described above.

Figure 4:
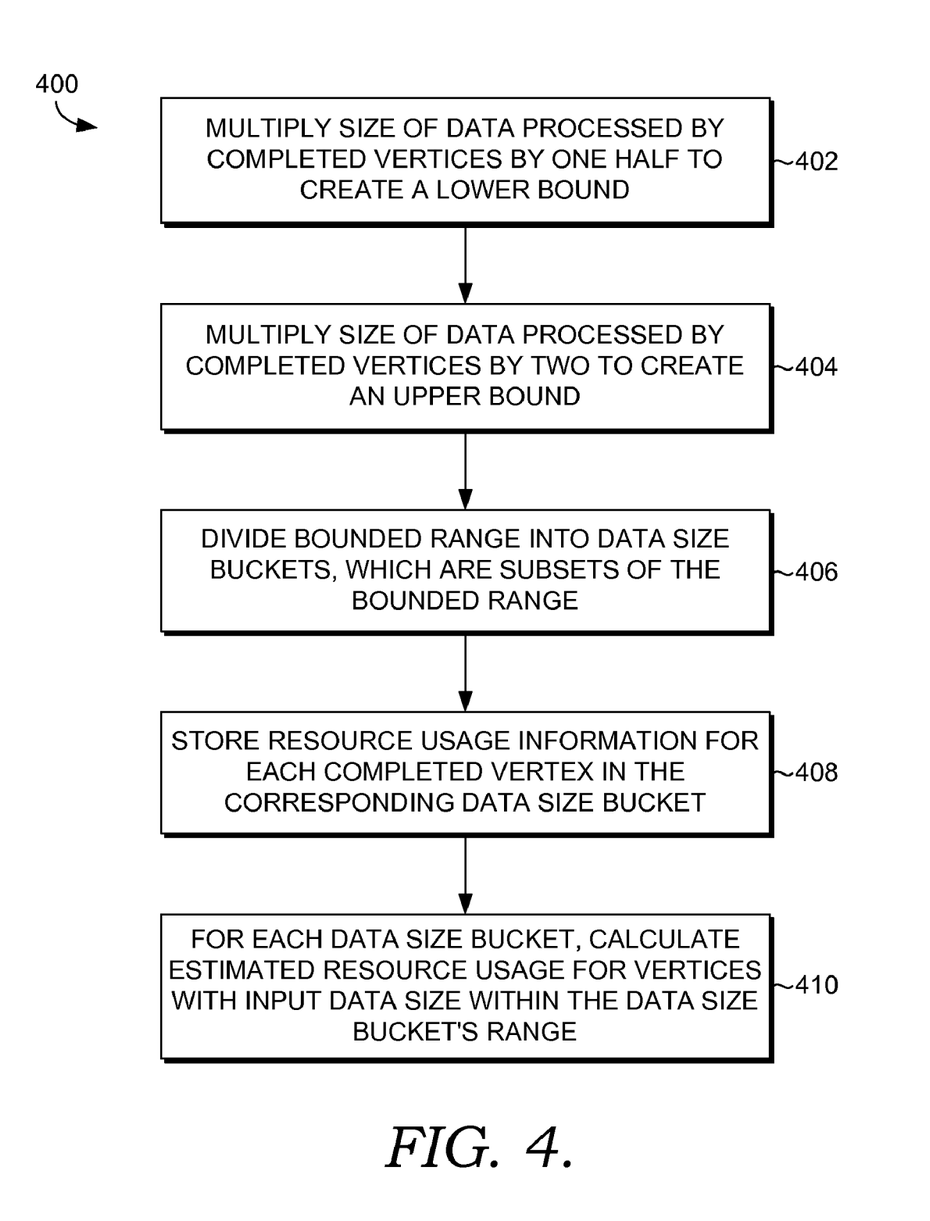
FIG. 4 is a flow chart of an exemplary method for estimating resource usage for vertices that have not completed.

With reference now to FIG. 4, the job manager identifies the size of the data processed in the completed vertices, multiplies the data size by one half to create a lower bound in step 402, and multiplies the data size by two to create an upper bound in step 404. The data size range bounded by the upper and lower bound is divided into a number of buckets in step 406, where each bucket is a subset of the bounded range. In one embodiment, the bounded range is divided into approximately 100 buckets. The bucketed range may be dynamically adjusted each time actual computing resource usage information is received for a completed vertex. Each bucket formed in step 406 represents a subset of the data size range. In some embodiments, each bucket may represent a particular data size. In step 408, the job manager stores the actual computing resource usage information received from completed vertices in the appropriate bucket for the vertices' input data size. The job manager receives computing resource usage information from additional vertices as they complete and stores the information in the bucket corresponding to the vertices' data size. In step 410, for each data size bucket, the job manager calculates the estimated resource usage for vertices with input data size within the data size bucket's range.

Referring back to FIG. 3, the estimated resource usage information is transmitted to the process nodes in step 312. The job manager transmits estimated resource usage information for vertices that have not completed to the process nodes where the vertices are either running or waiting to be run.

In some embodiments, each time a vertex completes, the process node which ran the vertex transmits resource usage information to the job manager. In step 314, the job manager updates and retransmits estimated resource usage for the remaining vertices upon receiving resource usage information from completed vertices that were not considered in the previous estimation. Estimated resource usage information may be updated through the same bucketing method illustrated in FIG. 4, where the base data size used to create the lower and upper bound is an average of data portion sizes for completed vertices.

Figure 5:
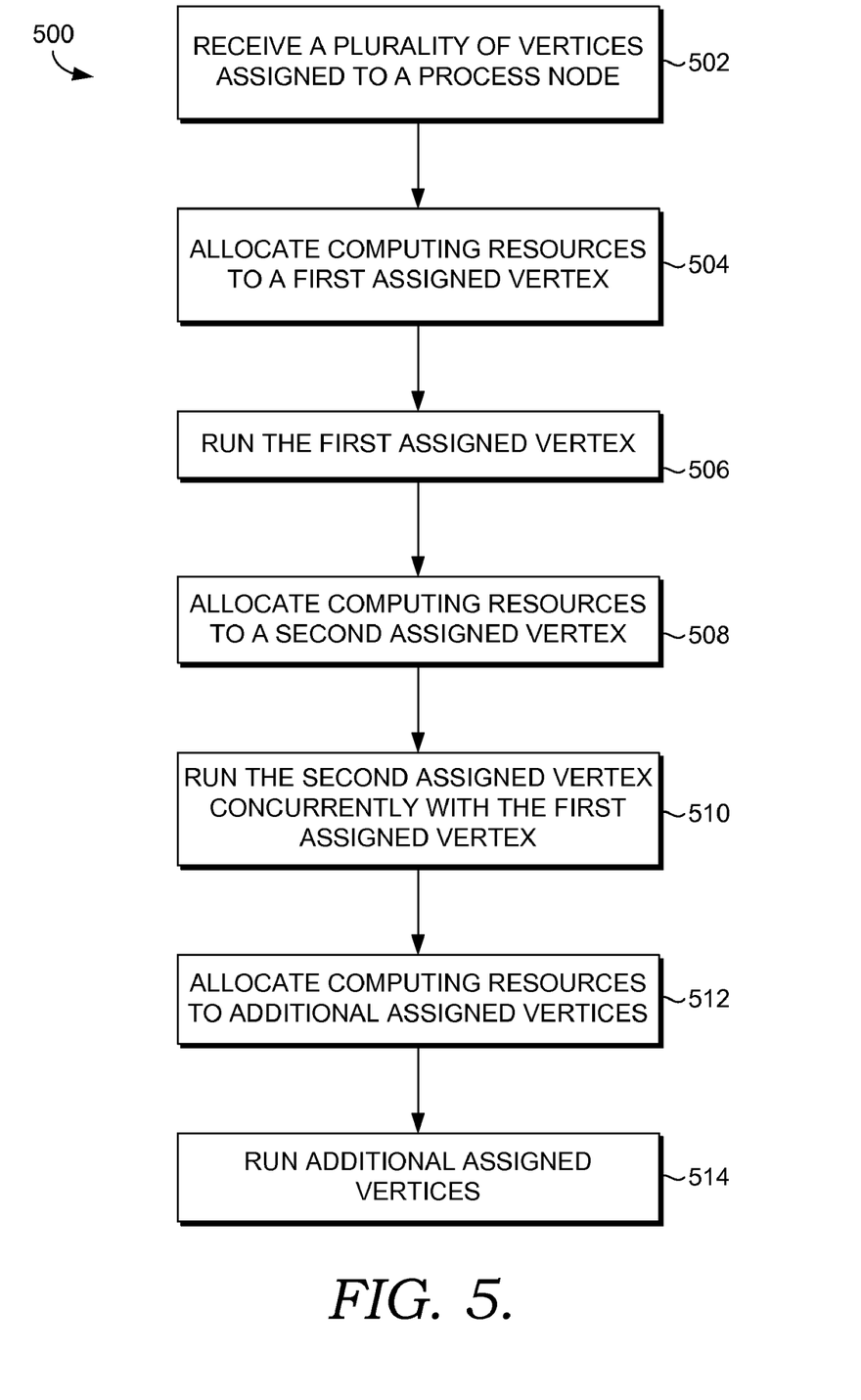
FIG. 5 is a flow chart of an exemplary method for allocating computing resources to and running vertices concurrently on a process node in a distributed data processing system.

FIG. 5 illustrates a method 500 for allocating computing resources to vertices on a process node. In step 502, a process node receives a plurality of assigned vertices from a data job. The process node may have vertices from other data jobs running or waiting to be run in a queue. The process node allocates computing resources to a first assigned vertex in step 504. Each process node may reserve a specified amount of memory, processing cores, disk space, or other computing resources for running vertices. Each process node may also reserve resources for running processes that are not vertices and may further reserve computing resources as free resources not allocated to any processes. The process node runs the first assigned vertex in step 506.

In step 508, the process node allocates computing resources to a second assigned vertex based on estimated resource usage information. In some embodiments, the process node has received estimated resource usage information for the second assigned vertex before running the vertex. In other embodiments, computing resource allocation is dynamically adjusted as the process node continues to receive updated resource usage estimates from the job manager. As discussed above, computing resources may be memory, processing cores, disk space, network bandwidth, or other computing resources. In step 510, the process node begins running the second assigned vertex concurrently with the first assigned vertex. Vertices from other data jobs may also be running concurrently on the process node.

Figure 6:
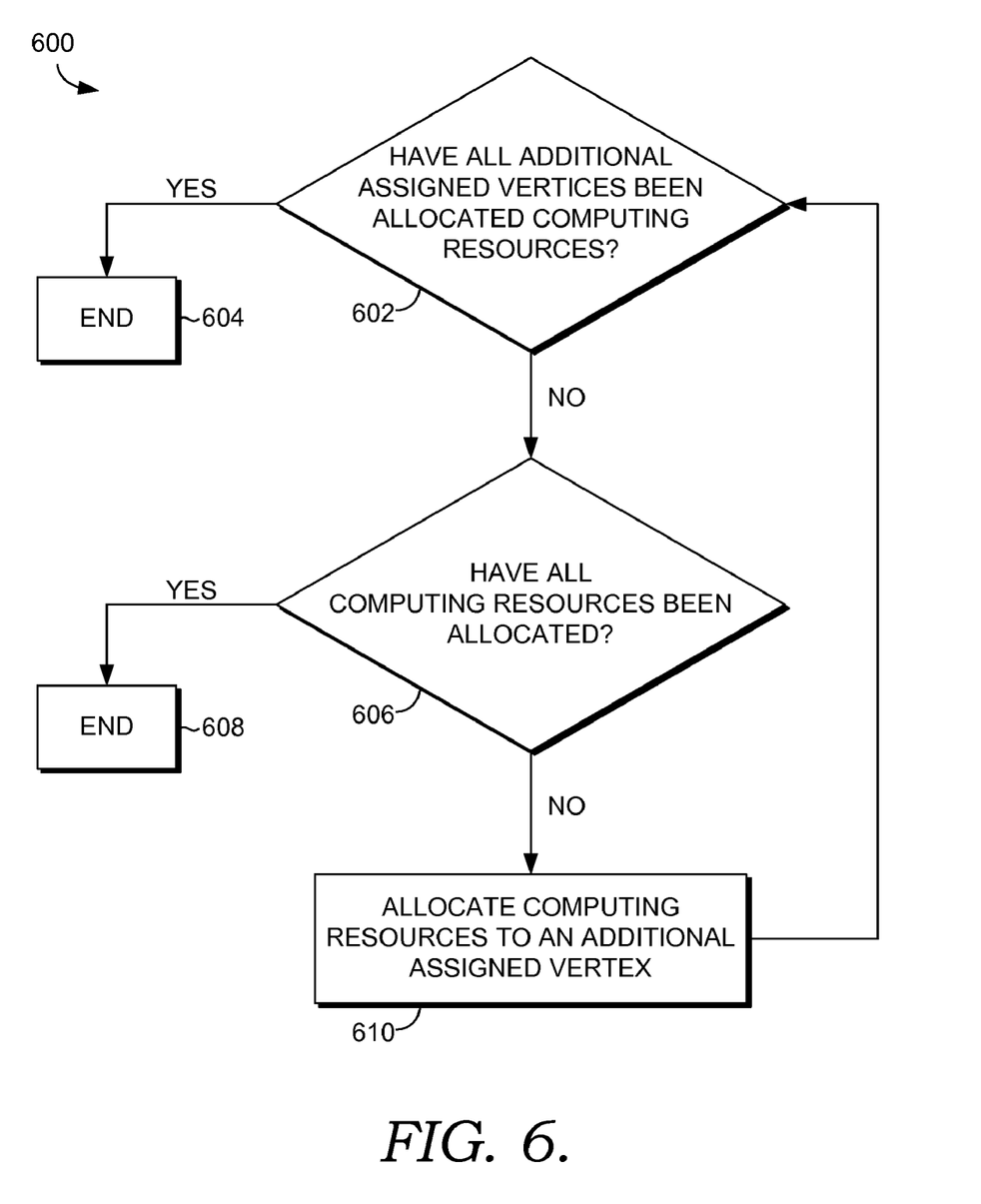
FIG. 6 is a flow chart of an exemplary method for allocating computing resources to vertices for concurrent processing on a process node in a distributed data processing system.

In step 512, the process node allocates computing resources to additional assigned vertices in the process node's queue. FIG. 6 illustrates a method 600 for allocating computing resources to additional assigned vertices in the process node's queue. In step 602, the process node determines whether all additional vertices have been allocated computing resources. If all additional vertices have been allocated computing resources, the method ends in step 604. If all additional vertices have not been allocated computing resources, the process node determines whether all computing resources have been allocated in step 606. If all computing resources have been allocated, that is, if no computing resources are available to be allocated, the method ends in step 608. If the process node does have computing resources available for allocation, then the process node allocates computing resources to an additional assigned vertex in step 610. Process 600 then repeats until either all additional assigned vertices have been allocated resources or until all computing resources have been allocated. With reference back to FIG. 5, these additional assigned vertices that are allocated computing resources are run in step 514.

Because the process node only has a finite amount of computing resources available, either because the machine has no further resources or the remaining computing resources have been reserved for other processes or reserved as free, some vertices may need to remain in the queue until sufficient resources are available to run those vertices.

The following example illustrates process node computing resource allocation in one embodiment of the invention. A process node receives estimated resource usage information provided by a job manager. A first vertex requires 512 megabytes of RAM and one processing core, and a second vertex requires one gigabyte of RAM and two processing cores. In this example, the process node has three gigabytes of RAM and six processing cores available. Because the total estimated computing resources required combination of the first vertex and the second vertex require an estimated 1.5 gigabytes of RAM and three processing cores, the process node will run both vertices concurrently. If a third vertex requires 2 gigabytes of memory and 4 processing cores, the total required resources to run all three vertices is 3.5 gigabytes of memory and 7 processing cores. Because the computing resources required are greater than the computing resources of the process node, the third vertex will not be run until sufficient computing resources are available.

In some situations, a particular vertex requires so many computing resources that although it is next in the queue, it cannot begin to run until many or all of the currently running vertices complete, thus slowing down the data jobs to which the other vertices in the queue belong. For example, if a resource-intensive vertex is next in the queue, it will not run if sufficient resources are not available. However, the vertex in the queue behind the resource-intensive vertex would be able to run.

Figure 7:
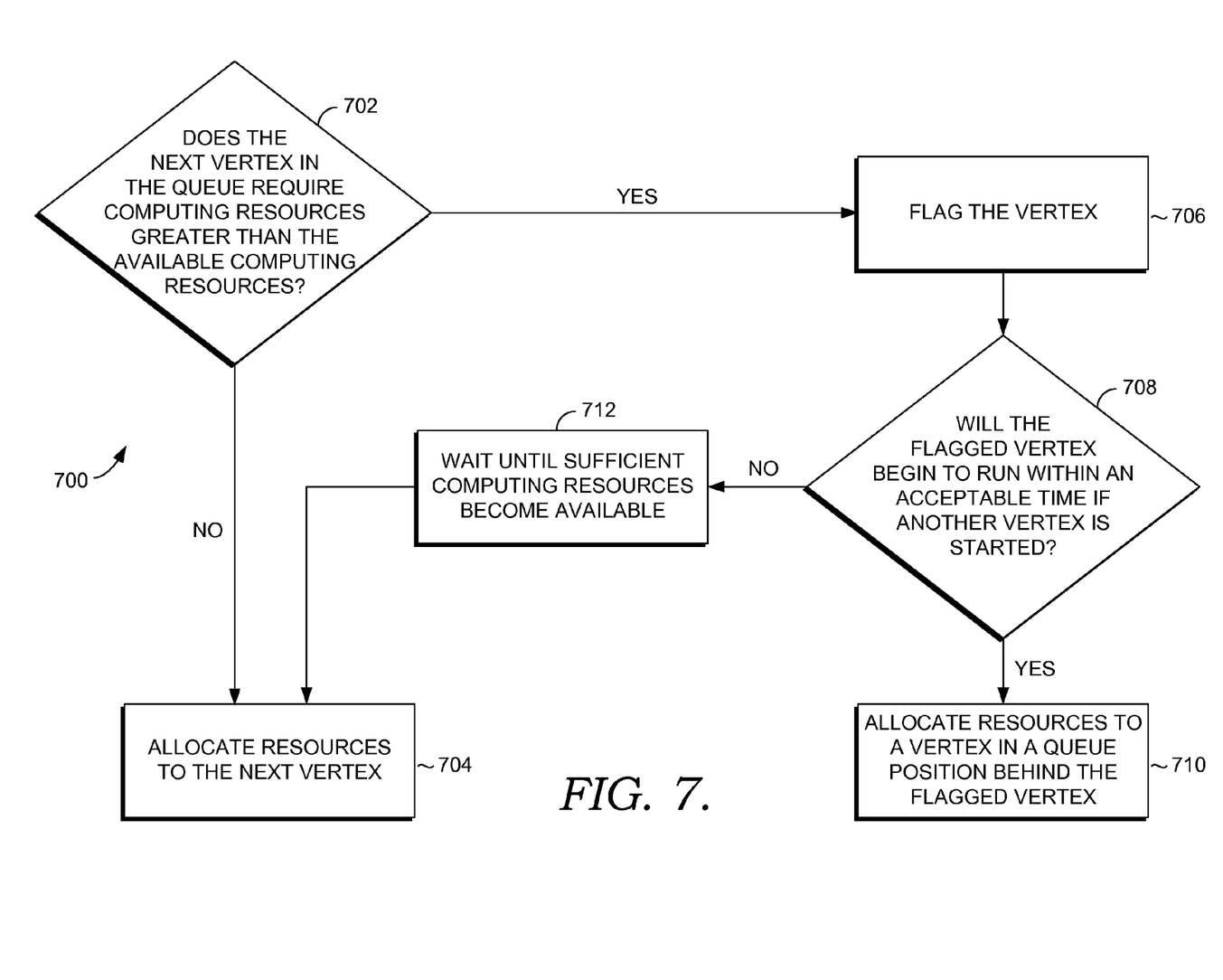
FIG. 7 is a flow chart of an exemplary method for allocating computing resources on a process node in a distributed data processing system when the next vertex in the queue requires more computing resources than are currently available.

FIG. 7 illustrates a method 700 for allocating computing resources on a process node in a distributed data processing system when the next vertex in the queue requires more computing resources than are currently available. In step 702, the process node determines if the next vertex in the queue requires computing resources greater than the available computing resources. If the next vertex does not, then the process node allocates computing resources to the vertex in step 704. If the next vertex does require more computing resources than are available, the vertex is flagged in step 706. In step 708, the process node determines whether the flagged vertex will begin to run within an acceptable time if another vertex is started before the flagged vertex. In some embodiments the acceptable time is less than or equal to the sum of the time the currently running vertices will take to complete and an acceptable delay for the flagged vertex. The acceptable delay may be the greater of a specified percentage of the flagged vertex's expected run time or a specified minimum delay.

If the flagged vertex will begin to run within an acceptable time, then the process node allocates computing resources to a vertex in a queue position behind the flagged vertex in step 710. If the flagged vertex will not begin to run within an acceptable time, then the process node waits until sufficient computing resources become available in step 712 and then allocates resources to the flagged vertex in step 704.

Figure 8:
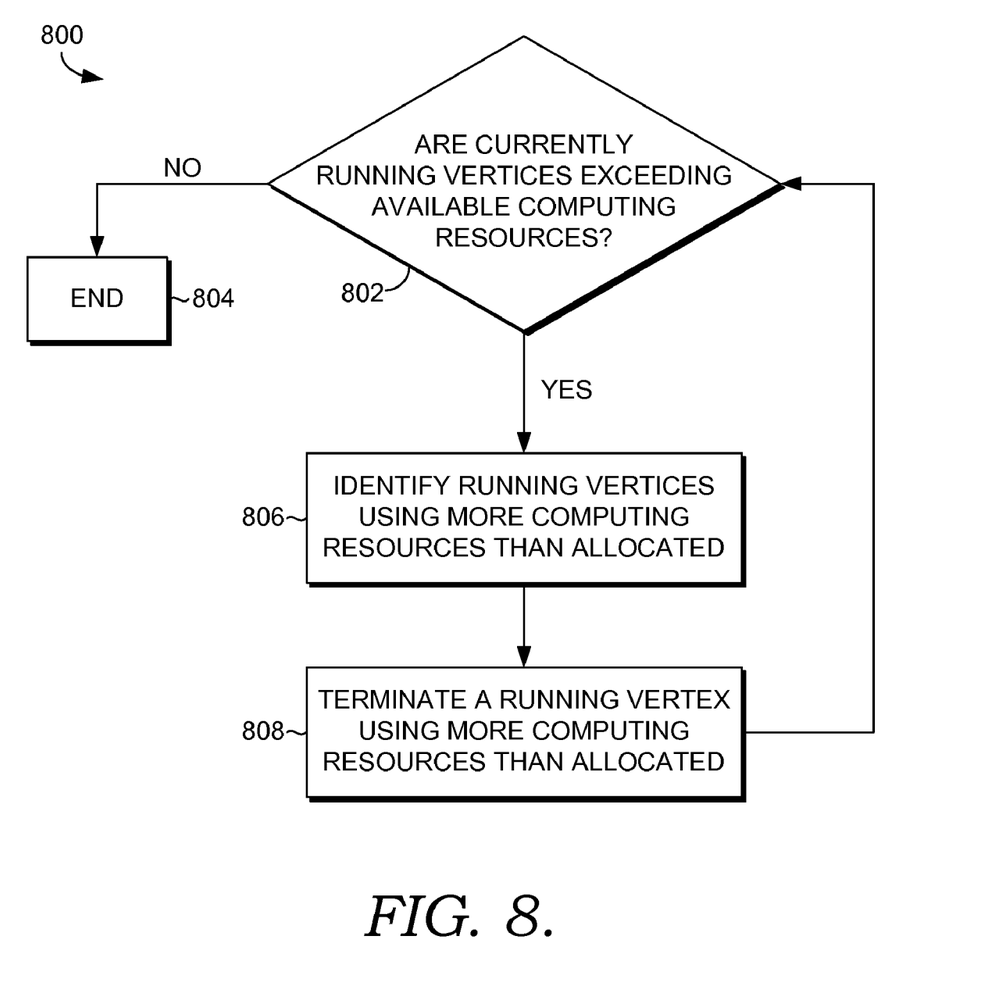
FIG. 8 is a flow chart of an exemplary method for terminating vertices when the currently running vertices are exceeding the available computing resources.

Because vertices are allocated computing resources based on estimated resource usage information transmitted by the job manager, the actual amount of computing resources a vertex uses may differ from the estimate. FIG. 8 illustrates a method 800 for terminating vertices when the currently running vertices are exceeding the available computing resources. In step 802, the process node determines if currently running vertices are exceeding available computing resources. If they are not, the method ends in step 804. If the currently running vertices are exceeding the available computing resources, currently running vertices using more computing resources than they were allocated are identified in step 806. One running vertex using more computing resources than allocated is terminated in step 808. Method 800 then repeats until currently running vertices are not exceeding available computing resources. In some embodiments, terminated vertices are placed back in the queue of the process node.

In some embodiments, process nodes assume a default computing resource allocation for each vertex rather than running vertices one-at-a-time until computing resource usage estimates are received. In one embodiment this default allocation is two cores and 2 gigabytes of memory. Empirical observation indicates that allocating two processing cores, rather than all possible cores, does not significantly impede vertex completion time. In some embodiments, the default computing resource allocation may be updated when enough actual computing resource information for completed vertices is received for the job manager to calculate an estimate, as discussed above.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. One or more computer storage device having computer-useable instructions embodied thereon for performing a method for scheduling vertices in a cluster, the method comprising:
   receiving a data job;
   dividing the data job into a plurality of vertices;
   assigning the plurality of vertices to one or more process nodes that comprise the cluster;
   receiving resource usage information for one or more vertices, wherein the vertices have run to completion, and wherein resource usage information for the vertices has been determined; and
   for each of the plurality of vertices for which resource usage information has not been received:
   estimating resource usage of the vertex from the received resource usage information for the completed vertices, wherein estimating resource usage comprises:
   (A) estimating an input data size range;
   (B) dividing the input data size range into data size buckets,
   wherein the data size buckets are subsets of the data size range;
   (C) storing resource usage information for each completed vertex in the corresponding data size bucket; and
   (D) for each data size bucket, calculating estimated resource usage information for uncompleted vertices with an input data size within the data size bucket's range; and
   transmitting the estimated resource usage of the vertex to the process node in the cluster to which the vertex is assigned, wherein the process node allocates computing resources to the vertex based on the estimated resource usage.

2. The device of claim 1, wherein resource usage information comprises at least one of memory usage, processor core usage, disk usage, and network usage.

3. The device of claim 1, wherein assigning the plurality of vertices to one or more process nodes that comprise the cluster further comprises assigning two or more vertices to the same process node.

4. The device of claim 1, further comprising:
   receiving resource usage information for additional completed vertices, wherein the additional completed vertices have run to completion, and wherein resource usage information for the additional completed vertices has been determined; and
   transmitting updated estimated resource usage for the vertices that have not completed to the process nodes to which the vertices that have not completed are assigned.

5. The device of claim 1, wherein estimating resource usage further comprises creating estimate values based on a relationship between the size of the data processed by completed vertices and the resource usage information of the completed vertices.

6. The media of claim 1, wherein estimating an input data size range comprises:
   multiplying the size of the data processed by the first vertex to complete by one half to create a lower bound; and
   multiplying the size of the data processed by the first vertex to complete by two to create an upper bound.

7. A method for allocating computing resources to vertices on a process node, the method comprising:
- on a process node, receiving information about a plurality of vertices assigned to the process node;
- receiving estimated resource usage information for at least one of the plurality of vertices assigned to the process node;
- allocating computing resources to a first assigned vertex;
- running the first assigned vertex;
- allocating computing resources to a second assigned vertex based on the received estimated resource usage information;
- running the second assigned vertex concurrently with the first assigned vertex;
- allocating computing resources to additional assigned vertices until either all computing resources have been allocated or computing resources are allocated to all additional assigned vertices;
- reserving an amount of memory for running vertices;
- reserving an amount of memory for running processes that are not vertices; and
- reserving an amount of free memory, wherein free memory is not available to be allocated to assigned vertices or available for running processes that are not vertices.

8. The method of claim 7, further comprising:
- upon determining that currently running vertices are exceeding available computing resources, terminating one or more running vertices that are using more computing resources than the vertices were allocated; and
- upon determining that after terminating one or more running vertices using more computing resources than the vertices were allocated that the currently running vertices continue to exceed available computing resources, terminating the most recent vertex to begin running.

9. The method of claim 7, wherein computing resources are allocated to the additional assigned vertices according to the position of the additional assigned vertices in a queue.

10. The method of claim 9, wherein if the next vertex in the queue awaiting allocation of computing resources requires computing resources in excess of the available computing resources, the next vertex is flagged and is not allocated computing resources.

11. The method of claim 10, further comprising:
- upon determining that the flagged vertex will begin to run no later than the sum of the time the currently running vertices will take to complete and an acceptable delay for the flagged vertex, allocating resources to and running an assigned vertex in a queue position behind the flagged vertex,
- wherein the acceptable delay for the flagged vertex is caused by running the assigned vertex in a queue position behind the flagged vertex before running the flagged vertex; and
- upon determining that the flagged vertex will not begin to run before the sum of the time the currently running vertices will take to complete and an acceptable delay, waiting until the currently running vertices have completed, allocating resources to the flagged vertex, and running the flagged vertex.

12. The method of claim 11, wherein the acceptable delay for the flagged vertex is the greater of a specified percentage of the flagged vertex's expected run time or a specified minimum delay.

13. A vertex assignment scheduling system for scheduling vertices in a cluster, the system comprising:
- a computing device associated with a job manager having one or more process nodes and one or more computer-readable storage media; and
- a data store coupled with the job manager,
wherein the job manager:
- assigns a plurality of vertices to the one or more process nodes that comprise a cluster,
- receives resource usage information for assigned vertices that have completed, and
- calculates, based on the received resource usage information for the completed vertices, estimated resource usage for the assigned vertices for which resource usage information has not been received;
and wherein at least one of the one or more process nodes:
- transmits resource usage information to the job manager for each vertex assigned to the process node that completes,
- allocates computing resources based upon estimated resource usage transmitted to the process node by the job manager such that multiple vertices run concurrently on the process node, and
- allocates computing resources according to the position of assigned vertices in a queue on the process node, and wherein if the next vertex awaiting allocation of computing resources in the queue requires computing resources in excess of the available computing resources of the process node, the next vertex is flagged and is not allocated computing resources by the process node.

14. The system of claim 13, wherein the job manager updates the estimated resource usage of the assigned vertices based on received resource usage information for additional assigned vertices that have completed.

15. The system of claim 13, wherein estimating resource usage further comprises:
- estimating an input data size range;
- dividing the input data size range into data size buckets, wherein the data size buckets are subsets of the data size range;
- storing resource usage information for each completed vertex in the corresponding data size bucket; and
- for each data size bucket, calculating estimated resource usage information for uncompleted vertices with an input data size within the data size bucket's range.

16. The system of claim 15, wherein estimating an input data size range comprises:
- multiplying the size of the data processed by the first vertex to complete by one half to create a lower bound; and
- multiplying the size of the data processed by the first vertex to complete by two to create an upper bound.

17. The system of claim 13, wherein:
- upon determining that the flagged vertex will begin to run no later than the sum of the time the currently running vertices will take to complete and an acceptable delay for the flagged vertex, running an assigned vertex in a queue position behind the flagged vertex, and
- wherein the acceptable delay for the flagged vertex is caused by running the assigned vertex in a queue position behind the flagged vertex before running the flagged vertex.

18. The system of claim 17, wherein the acceptable delay for the flagged vertex is the greater of a specified percentage of the flagged vertex's expected run time or a specified minimum delay.

* * * * *